Jan. 9, 1940.　　　　R. C. CASTLES　　　　2,186,365
SOILED DISH CONTAINER
Filed March 26, 1937　　　2 Sheets-Sheet 1
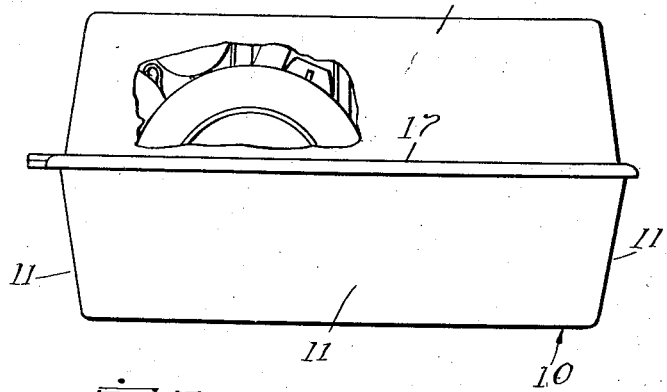
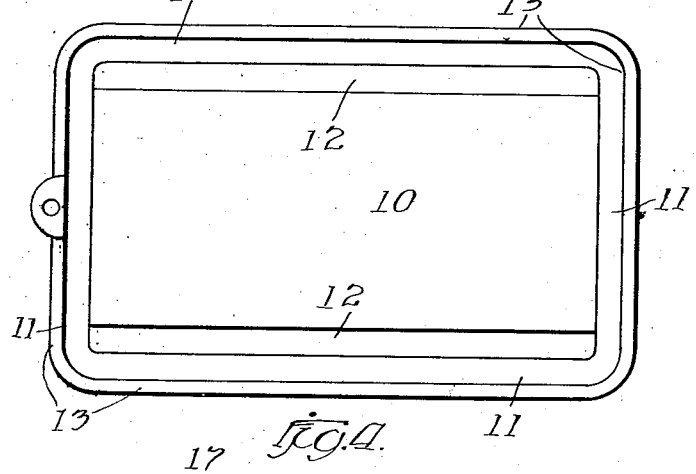
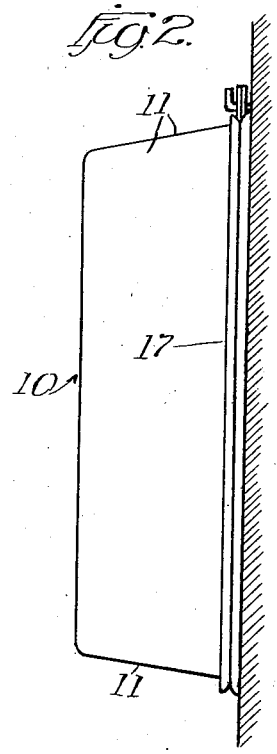
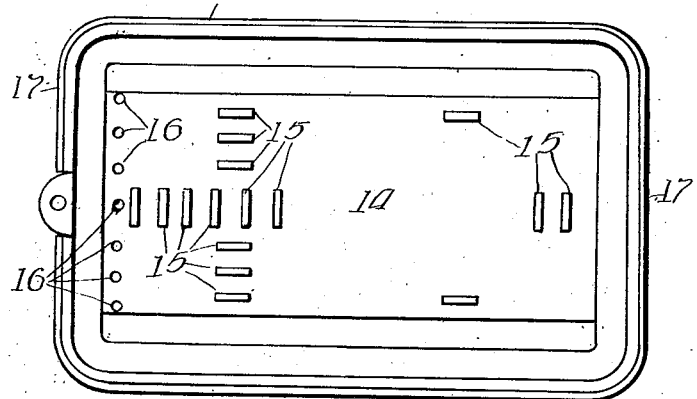
Witness:
Harry R. L. White
Inventor:
Richard C. Castles.
By Jeff & Jeff
Attys.

Jan. 9, 1940.  R. C. CASTLES  2,186,365
SOILED DISH CONTAINER
Filed March 26, 1937   2 Sheets-Sheet 2
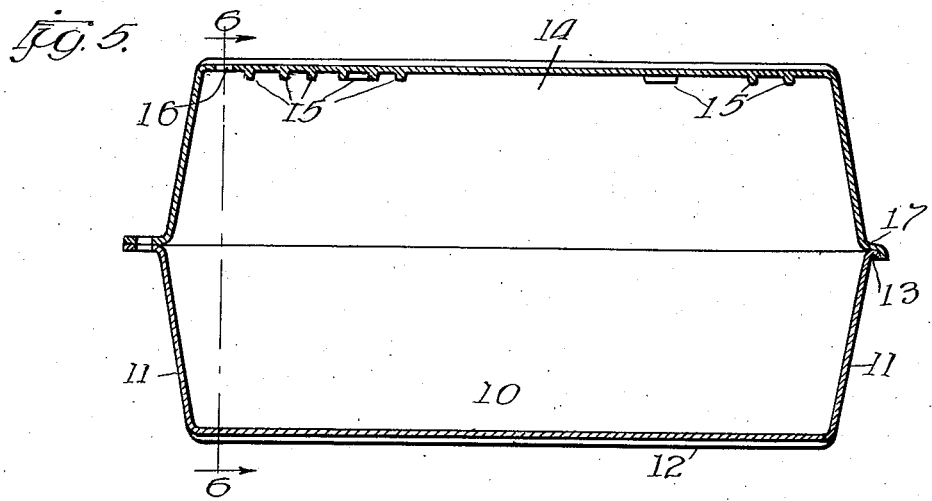
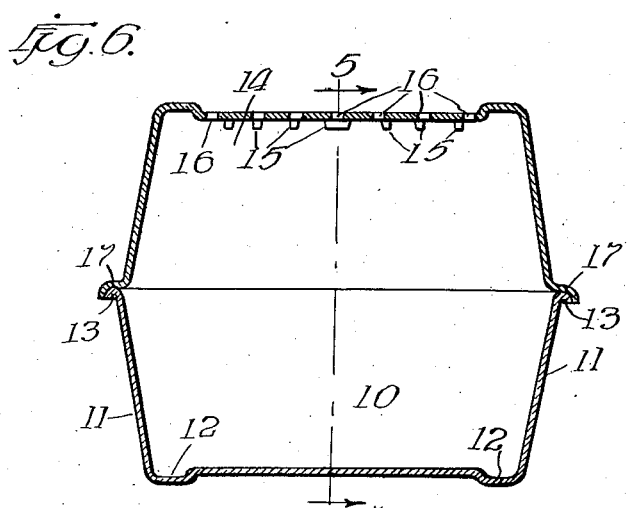
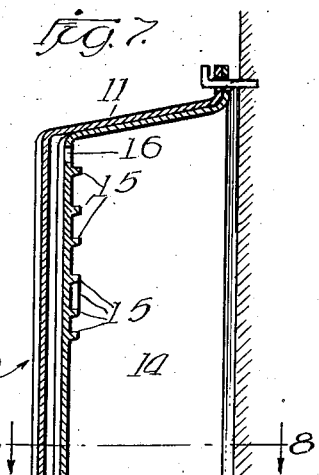
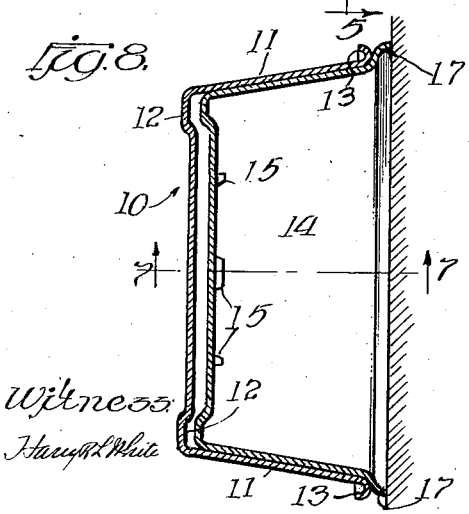
Inventor
Richard C. Castles.
By Tefft & Tefft
Atty's.
Witness
Harry L. White Patented Jan. 9, 1940

2,186,365

UNITED STATES PATENT OFFICE 2,186,365

SOILED DISH CONTAINER

Richard C. Castles, Chicago, Ill.

Application March 26, 1937, Serial No. 133,169

2 Claims. (Cl. 220—8)

My invention relates to soiled dish containers and more particularly to a soiled dish container capable of dual use not only as a container for soiled dishes which may be housed from sight but as additional means for washing and rinsing the dishes during the washing operation.

One of the objects of my invention is in the provision of a soiled dish container which has a cooperating member adaptable for use as a means for housing the soiled dishes from sight which member may also be used thereafter as a drain pan upon which the drying dishes may be placed, said member being so fashioned as to permit a nesting arrangement with the first pan when not in use.

Another object of my invention lies in the provision of a combined soiled dish container and rinsing pan, said members being so fashioned and arranged as to permit a nesting arrangement to conserve space when not in use.

A still further object of my invention is the provision of cooperating pan members so arranged as to permit soiled dishes, cutlery, etc., to be completely housed from sight, one of the pans being imperforate and capable of use as an ordinary dish pan while the other pan is so arranged as to support the dishes during the drying operation and to drain them, said pan also having marginal flanges cooperating with the imperforate pan so that it will not only completely cover same, but may also nest in said pan when not in use.

Other objects of my invention appear in the following specification, taken in connection with the accompanying drawings, in which:

Fig. 1 is a side elevation of my soiled dish container;

Fig. 2 is an elevational view showing the container hung upon the wall or cupboard;

Fig. 3 is a plan view showing the inside of the imperforate pan;

Fig. 4 is a plan view showing the inside of the perforate pan or cover;

Fig. 5 is a sectional view of the soiled dish container taken along the line 5—5 of Fig. 6;

Fig. 6 is a cross sectional view taken along the lines 6—6 of Fig. 5;

Fig. 7 is a sectional view taken along the lines 7—7 of Fig. 8, and

Fig. 8 is a sectional view taken along the line 8—8 of Fig. 7.

Before referring specifically to the drawings for a detail description of my soiled dish container, it might be stated that this unpleasant operation does not always immediately follow the clearing of the dishes, cutlery, etc., from the table. As a matter of fact, following the partaking of food, a certain physical lassitude takes place within the human body that usually delays the unpleasant dishwashing operation. Modern inventions have apparently neglected this necessary operation, and applicant has provided herein a novel means to hide the soiled dishes from sight, as well as providing a means to assist in the final dishwashing and drying operation, as well as combining the members in a structural relationship that permits them to be hung in a nested arrangement somewhere upon the kitchen wall or cupboard, etc.

Now referring specifically to the drawings, applicant has provided an imperforate pan or lower member 10 which is shown in the drawings as constructed in an oblong manner, however, as far as the invention is concerned, it is quite obvious that not only this pan, but the cooperating pan member, might just as well be formed in some other shape, although the form herein disclosed lends itself readily to the novel features of applicant's soiled dish container.

The pan 10 has its side walls 11 extending upwardly and outwardly in a rather conventional manner. The bottom of pan 10 is flanged longitudinally of its length at 12 on either side so that it will accommodate itself to the usual corrugations in the sink and effectively drain same, these flanges providing on the inside a depression in which the larger dishes or other contents may be placed around the edge.

The upper edges of the side walls 12 are flanged outwardly at 13 in a manner perhaps best shown in Fig. 6. A cooperating pan member of similar form and shape in order to coincide with the first mentioned pan is clearly shown at 14. This pan also has its side walls extending upwardly. This pan 14, however, has a series of dish supporting members either integrally formed therewith or attached thereto as shown at 15. These dish supporting members may assume any desired shape. However, this pan 14 is perforate at one end as at 16 in order to provide a drain for the drying dishes.

Again we find the edges of the cooperating pan 14 to be formed as at 17 in a manner to overlie the flanges 13 in a manner shown clearly in Fig. 6. Obviously the manner of flanging these cooperating edges might assume a somewhat different shape as long as the pan 14 could assume a position overlying pan 10 and completely housing the soiled dishes adapted to be contained therein.

In Figs. 7 and 8, it is clearly shown that pan 14 is nested within pan 10 when the container is not in use. This permits the device to be readily hung upon the wall of the kitchen.

As far as the operation of applicant's soiled dish container is concerned, it is quite obvious, in view of the previous description, that dishes may be placed in the imperforate pan 10 and covered from sight by the cooperating pan 14.

When the dishes are to be washed, the pan 10 may be used as a conventional dishpan. The pan 14 is removed as a cover and placed beside the dish pan with the drain 16 assuming a position adjacent the sink. As the dishes are washed, they are placed in the now inverted pan 14 assuming an upstanding position by virtue of the supports 15. The rinse water is drained from this pan through the apertures directly into the sink. Of course, the drain apertures could assume different shapes and sizes than disclosed in the present drawings.

When the dishwashing and dish-drying operation has been completed, the pans are properly washed and dried, placed in the nested position shown in Fig. 7 and hung in their accustomed place in the kitchen preparatory to an assured subsequent use.

What I claim is:

1. A soiled dish container comprising a pair of twin nestable pans of thin sheet material, one of said pans being shallower than the other to be nested within the other, and both of said pans equipped with flaring peripheral walls terminating in outwardly projecting edge flanges of unlike configuration such that one flange flares outwardly and upwardly with respect to the open side of the pan, and the other flange flares outwardly and downwardly with respect to the open side of the pan; said flanges being of equal dimensions so that they may contact each other when the pans are in nested position to prevent wedging action between the flared walls of the pans, and contact each other to prevent relative lateral movement between the twin pans when one of said pans is in inverted position with respect to the other.

2. A soiled dish container comprising a pair of twin nestable pans of thin sheet material, one of said pans being adapted to be nested within the other and adapted to be inverted over the other, both of said pans being equipped with flaring peripheral walls terminating in cooperating edge flanges; said edge flanges being formed to provide an annular convex contacting surface on one of said twin pans, and two contacting surfaces on the other pan, one of which comprises a convex surface, and the other of which comprises a concave surface; the arrangement being such that when the twin pans are in nested relationship the two convex surfaces engage to prevent wedging action between the flared walls of the pans, and when one of said pans is superposed in inverted position over the other the convex surface of one pan engages the concave surface of the other to prevent relative lateral movement between the pans.

RICHARD C. CASTLES.